(12) United States Patent
Sesita et al.

(10) Patent No.: US 7,478,574 B2
(45) Date of Patent: Jan. 20, 2009

(54) ELECTRIC ACTUATOR

(75) Inventors: Naoto Sesita, Kawasaki (JP); Katuyuki Tanaka, Kawasaki (JP); Yusuke Mizukoshi, Kawasaki (JP); Hiroyuki Kurihara, Fujisawa (JP); Yoshihisa Watanabe, Yokohama (JP)

(73) Assignee: Igarashi Electric Works, Ltd., Kanagawa (JP)

( * ) Notice: Subject to any disclaimer, the term of this patent is extended or adjusted under 35 U.S.C. 154(b) by 253 days.

(21) Appl. No.: 11/407,160

(22) Filed: Apr. 19, 2006

(65) Prior Publication Data

US 2006/0243078 A1    Nov. 2, 2006

(30) Foreign Application Priority Data

Apr. 26, 2005 (JP) ............................. 2005-128415
Apr. 26, 2005 (JP) ............................. 2005-128417

(51) Int. Cl.
*F16H 1/16* (2006.01)
(52) U.S. Cl. ......................... 74/425; 74/409; 74/411
(58) Field of Classification Search ................. 74/425; 384/519, 537, 626, 520, 551; 464/30
See application file for complete search history.

(56) References Cited

U.S. PATENT DOCUMENTS

| | | | | | |
|---|---|---|---|---|---|
| 3,959,673 | A | * | 5/1976 | Montagu | 310/38 |
| 4,026,163 | A | * | 5/1977 | Merkert | 74/425 |
| 4,041,730 | A | * | 8/1977 | Kress | 464/30 |
| 4,643,040 | A | * | 2/1987 | Adam et al. | 74/425 |
| 4,652,781 | A | * | 3/1987 | Andrei-Alexandru et al. | 310/83 |
| 4,827,790 | A | * | 5/1989 | Bisiach | 74/425 |
| 4,885,948 | A | * | 12/1989 | Thrasher et al. | 74/89.14 |
| 5,186,068 | A | * | 2/1993 | Heller | 74/425 |
| 5,777,411 | A | * | 7/1998 | Nakajima et al. | 310/83 |
| 5,952,746 | A | * | 9/1999 | Mittmann et al. | 310/42 |
| 6,044,723 | A | * | 4/2000 | Eda et al. | 74/388 PS |
| 6,133,659 | A | * | 10/2000 | Rao | 310/89 |
| 6,217,453 | B1 | * | 4/2001 | Thompson | 464/89 |
| 6,269,709 | B1 | * | 8/2001 | Sangret | 74/398 |
| 6,357,313 | B1 | * | 3/2002 | Appleyard | 74/388 PS |
| 6,397,691 | B1 | * | 6/2002 | Greene | 74/89.2 |
| 6,486,577 | B1 | * | 11/2002 | Ursel et al. | 310/51 |
| 6,491,131 | B1 | * | 12/2002 | Appleyard | 180/444 |
| 6,536,953 | B1 | * | 3/2003 | Cope et al. | 384/536 |
| 6,591,707 | B2 | * | 7/2003 | Torii et al. | 74/425 |
| 6,979,919 | B2 | * | 12/2005 | Gotmalm | 310/54 |
| 2002/0053249 | A1 | * | 5/2002 | Jammer et al. | 74/425 |

(Continued)

FOREIGN PATENT DOCUMENTS

JP    2005-30545 A    3/2005

(Continued)

*Primary Examiner*—Richard W L Ridley
*Assistant Examiner*—Phillip Johnson
(74) *Attorney, Agent, or Firm*—Davis & Bujold, P.L.L.C.

(57) ABSTRACT

A motor shaft puts through a motor casing and a gear casing which are detachably connected to each other. In the motor casing, a rotor is fixed to the motor shaft, while a stator is fixed on the inner circumferential surface of the motor casing. The motor shaft has a worm which engages with a worm wheel in the gear casing. A collar in which the motor shaft is pressingly fitted is provided in the middle of the motor shaft at the end of the gear casing. The motor shaft is supported at each end of the worm in the gear casing.

4 Claims, 4 Drawing Sheets

U.S. PATENT DOCUMENTS

| | | | |
|---|---|---|---|
| 2002/0079764 A1* | 6/2002 | Cook | 310/89 |
| 2002/0096005 A1* | 7/2002 | Oka et al. | 74/388 PS |
| 2002/0148315 A1* | 10/2002 | Mittendorf et al. | 74/425 |
| 2006/0238048 A1* | 10/2006 | Sesita et al. | 310/88 |

FOREIGN PATENT DOCUMENTS

WO     WO 2005029684 A1 *   3/2005

* cited by examiner

ELECTRIC ACTUATOR

This application claims priority from Japanese Application Serial Nos. 2005-128415 filed Apr. 26, 2005 and 2005-128417 filed Apr. 26, 2005.

BACKGROUND OF THE INVENTION

The present invention relates to an electric actuator used in a drive system such as a power tailgate or power sliding door of an automobile.

Space and carrying capacity of an automobile are limited, so that it is requested to make such an actuator smaller and lighter with improvement in power output.

A conventional electric actuator comprises a motor casing having a motor; and a gear casing having a worm wheel and detachably connected to the motor casing. A motor shaft extends from the motor casing to the gear casing, and a worm is formed on the motor shaft in the gear casing to mesh with the worm wheel. The motor shaft is supported by three points comprising a base end portion of the motor casing, an intermediate portion of an iron core and a worm and the end of the gear casing as disclosed in JP2005-30545A.

However, in the bearing structure above, the end of the motor shaft is rotatably mounted in a hole of the gear casing to cause a slight gap between the motor shaft and the hole. During the rotation of the motor shaft, owing to reaction force of engagement of the worm with the worm wheel, the end of the motor shaft is likely to swing making the depth of engagement of the worm wheel decreased to cause damage to the worm wheel.

Furthermore, with swinging of the end of the motor shaft, the motor shaft moves axially. Especially, if the motor shaft is supported by a ball bearing at the intermediate part, an inner race of the ball bearing in which the motor shaft is pressingly fitted is subjected to thrust load to produce vibration or noise.

The base end of the motor shaft is rotatably supported by a bearing at the end of the motor casing to increase the length of the motor shaft by the part where the base end portion of the motor shaft is supported. Also, the end of the motor casing projects axially by forming a space for receiving the bearing to increase the axial length of the motor casing, expanding the size and weight to increase cost.

SUMMARY OF THE INVENTION

In view of the disadvantages in the prior art, it is an object of the present invention to provide an electric actuator that enables vibration or noise in an inner race of a ball bearing in which a motor shaft is pressingly fitted to be reduced, the motor shaft being supported only by the gear casing side like a cantilever to make the actuator smaller and lighter, the connection being facilitated to reduce cost, the actuator preventing a worm wheel from being damaged.

BRIEF DESCRIPTION OF THE DRAWINGS

The features and advantages of the invention will become more apparent from the following description with respect to an embodiment as shown in appended drawings wherein.

DETAILED DESCIRPTION OF PREFERRED EMBODIMENTS

One embodiment of an electric actuator 1 comprises a motor 2 and a reduction mechanism "A". First, the motor 2 will be described.

Figure 1:
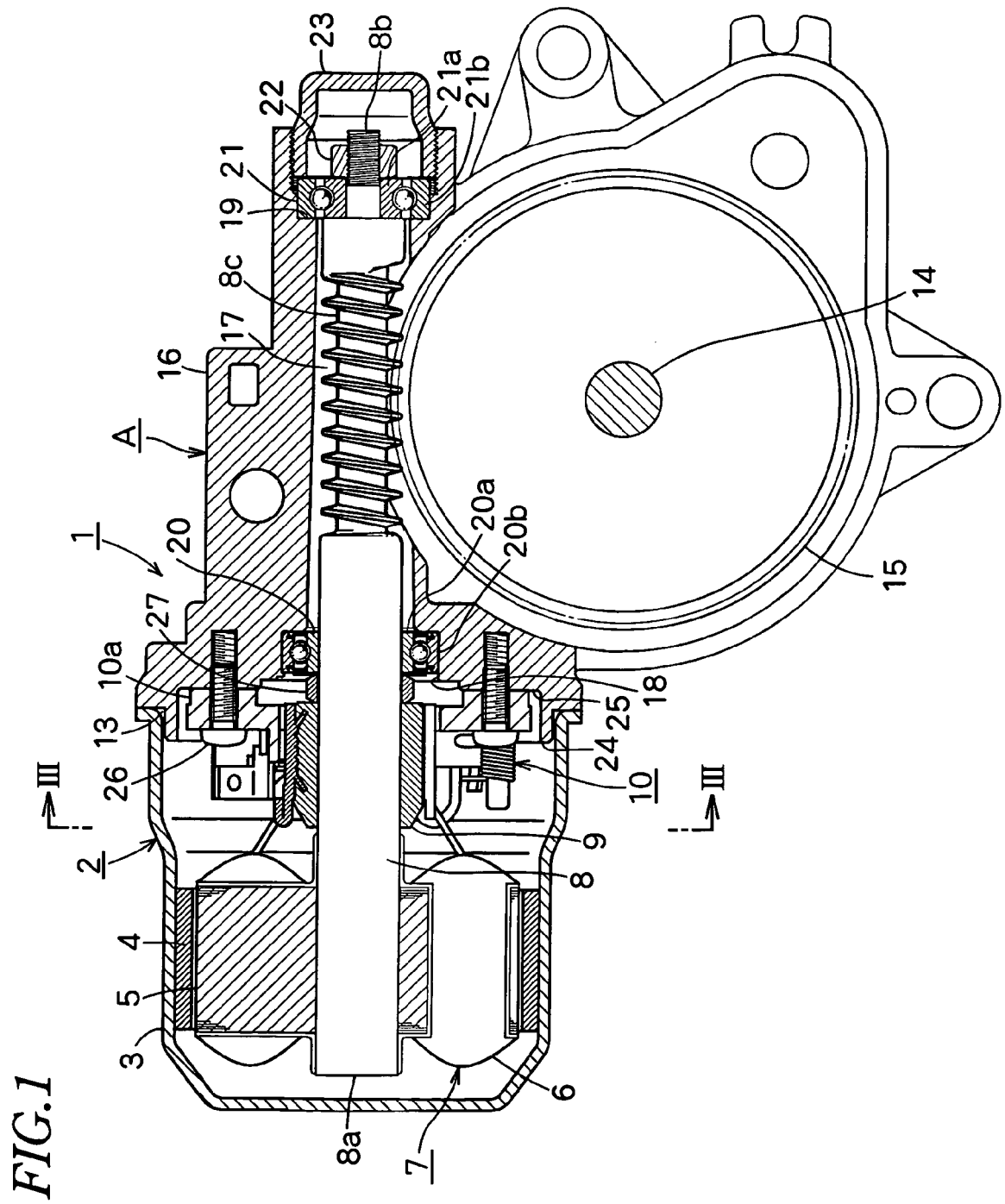
FIG. 1 is a vertical sectional side view of an embodiment of an electric actuator according to the present invention.
Figure 2:
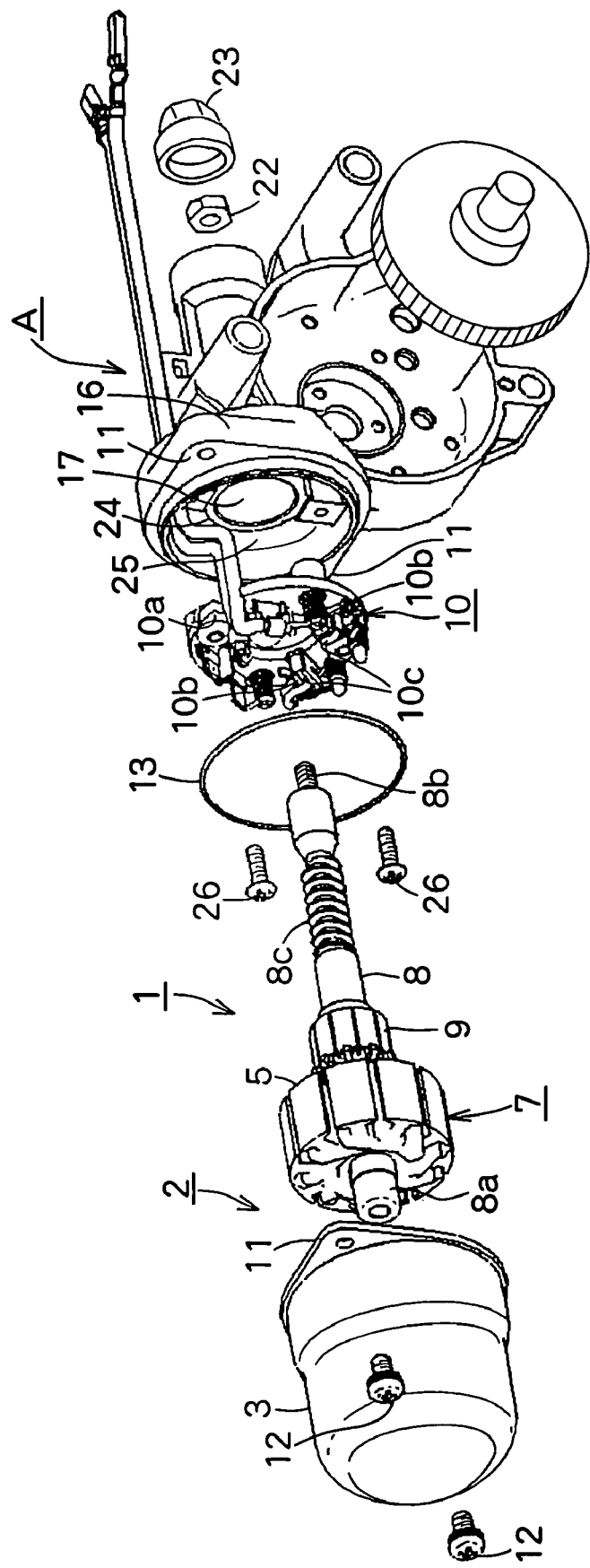
FIG. 2 is an exploded perspective view of a motor and a reduction mechanism.

As shown in FIGS. 1 and 2, the motor 2 comprises a thin bottom-having cylindrical deep-drawing thin motor casing 3 made of Al alloy; a stator 4 of a Nd—Fe—B permanent magnet fixed on the inner circumferential surface of the motor casing 3; a rotor 7 comprising an iron-core 5 on which a coil 6 is wound to face the inner circumferential surface of the stator 4; a motor shaft 8 pressingly fitted in the rotor 7; a commutator 9 in which the motor shaft 8 is pressingly fitted; and a brush unit 10 charging the commutator 9.

Figure 3:
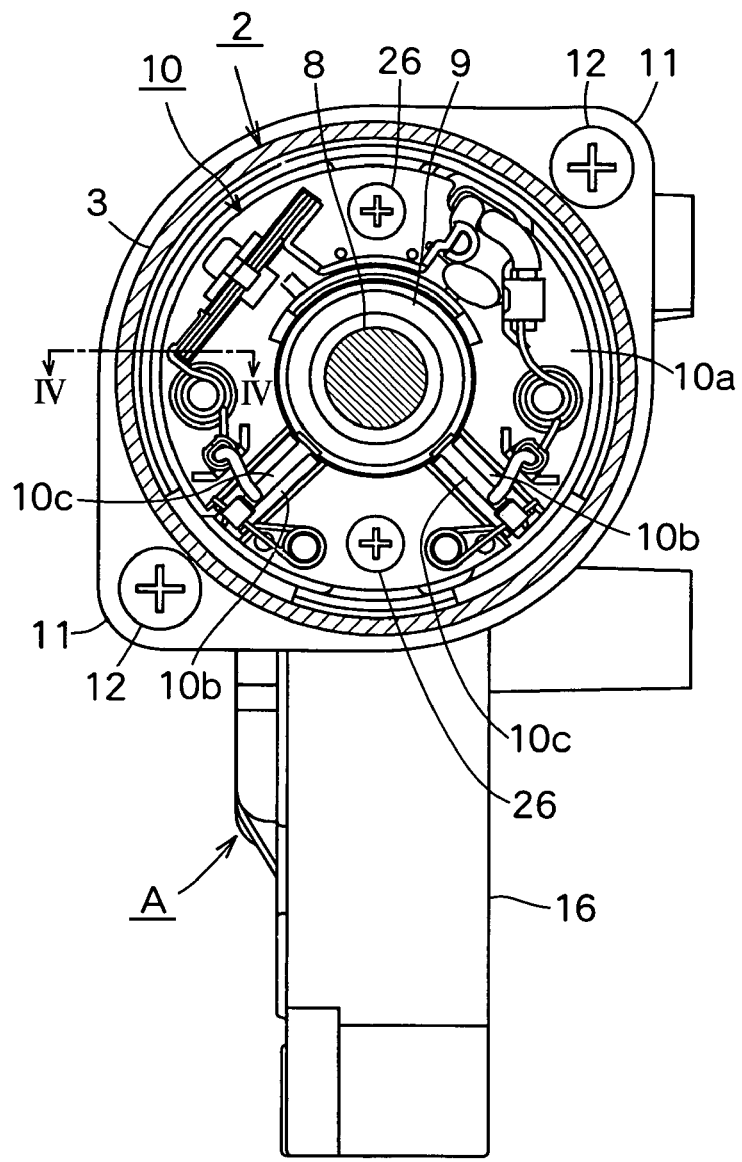
FIG. 3 is a vertical sectional side view seen in a direction of an arrow in the line III-III in FIG. 1 to show the connection of a motor casing with a gear casing.

As shown in FIG. 3, the brush unit 10 comprises an insulator 10a and a brush 10c connected to the insulator 10a via a brush holder 10b so that the brush 10c slidably contacts the commutator 9 perpendicular to an axis of the commutator 9.

The rotor 7 is pressingly fitted on part near the base end 8a of the motor shaft 8, and the commutator 9 is pressingly fitted on the motor shaft 8 at the opening end of the motor casing 3 adjacent to the rotor 7.

Figure 4:
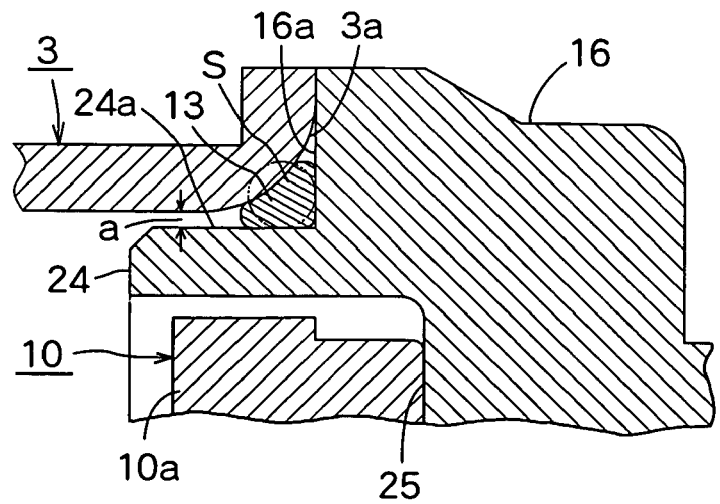
FIG. 4 is a horizontal sectional view taken along the line IV-IV in FIG. 3 to show the connection of the motor casing with the gear casing.

As shown in FIG. 4, at the opening end of the motor casing 3, an inner corner 3a is rounded. In FIG. 3, a pair of ears 11,11 is radially projected on a diagonal line symmetrically to an axis of the motor shaft 8. The pair of ears 11,11 is mounted to an end face 16a of a Al-casted gear casing 16 of the reduction mechanism "A" having a worm wheel 15 around a shaft 14, with bolts 12,12 and an elastic rubber O-ring 13, so that the motor casing 3 is detachably connected to the gear casing 16.

The motor shaft 8 extends in an axial hole 17 in the gear casing 16 and a worm 8c is formed near the end 8b in the gear casing 16 to mesh with the worm wheel 15. The base end 8a of the motor shaft 8 in the motor casing 3 has relatively thick diameter to provide rigidity enough to bear the weight of the rotor 7 pressingly fitted.

Enlarged axial holes 18,19 are formed in the axial hole 17, and first and second ball bearings 20,21 engage in the enlarged axial holes 18,19 respectively to bear the load applied in axial and radial directions by the motor shaft 8.

The first ball bearing 20 engages in the inner enlarged axial hole 18 which opens towards the motor casing 3 to support the part of the shaft 8 between the worm 8c and the base end 8a on which the iron core 5 and the commutator 9 is pressingly fitted.

The second ball bearing 21 engages in the outer enlarged axial hole 19 which opens outwards of the gear casing 16 opposite to the motor casing 3 to support the end 8b of the motor shaft 8 so that the base end 8a of the motor shaft 8 is free like a cantilever by supporting the motor shaft 8 only with each end of the worm 8c in the gear casing 16.

Thus, the part of the motor shaft 8 near the base end 8a is made shorter axially and omits a bearing-receiving space near the end of the motor casing 3. Reduction of the axial length of the motor casing 3 enables the whole body to become smaller in size and lighter in weight and makes it unnecessary to provide a bearing member at the base end 8a of the motor shaft 8 thereby reducing the number of parts and accessories to simplify the structure and decrease costs.

The end 8b of the motor shaft 8 comprises a smaller-diameter shaft the outer circumferential surface of which is screwed and pressed by of an inner race 21a of the second ball bearing 21 which engages in the enlarged axial hole 19 to form a projected part on which a nut 22 engages to enable it to be fixed in the inner race 21 a thereby suppressing axial movement of the motor shaft 8.

An outer race 21b engages in the outer enlarged hole 19 and is fixed by a cap 23 screwed in the axial hole 17 to enable the inner race 21 to be fixed with the nut 22 and to suppress thrust-radial movement of the end 8b of the motor shaft 8. Thus, during rotation of the motor shaft 3, the end 8b of the motor shaft 8 is prevented from being bent owing to engagement reaction force between the worm 8c and the worm wheel 15 thereby preventing the worm wheel 15 from being damaged.

On the end face 16a of the gear casing 16 facing the opening end of the motor casing 3, a circular projection 24 projects around an axis of the hole 17. As shown in FIG. 4, an expanded elastic rubber O-ring 13 is put around the outer circumferential surface 24a of the circular projection 24, and the inner corner 3a of the motor casing 3 engages. After the ears 11,11 are tightly contacted with the end face 16a of the gear casing 16, the motor casing 3 is connected to the gear casing 16 at two points by screwing bolts 12,12.

As shown by a dotted line in FIG. 4, the O-ring 13 has a circular section slightly greater than the area of a space "S" surrounded by the inner corner 3a of the motor casing 3 and the outer circumferential surface 24a of the circular projection 24 of the gear casing 16. When the opening end of the motor casing 3 is pressingly fitted onto the outer circumferential surface of the circular projection 24 during connection, the O-ring 13 is elastically collapsed and deformed by a pressing force of the inner corner 3a of the motor casing 3 and is partially invaded into a gap "a" between the inner circumferential surface of the motor casing 3 and the outer circumferential surface 24a of the circular projection 24 of the gear casing 16. Such restoring force acts to press the inner corner 3a of the motor casing 3 equally outwards to enable the gap "a" to become constant circumferentially. Thereafter, the ears 11,11 of the motor casing 3 is pressed onto the end 16a and bound with the bolts 12,12 thereby achieving axial alignment of the motor casing 3 with the gear casing 16 precisely.

In the inner circumferential surface of the circular projection 24 projecting from the inner surface of the gear casing 16, an annular recess 25 is formed and the insulator 10a of the brush unit 10 holding the brush 10a slidably contacting the commutator 9 perpendicular to the axis thereof is connected with a bolt 26.

As shown in FIG. 1, the first ball bearing 20 supporting the intermediate part of the motor shaft 8 is positioned in the vicinity of the commutator 9 pressingly fitted in the motor casing 3 and a collar 27 is disposed on the motor shaft 8.

Figure 5:
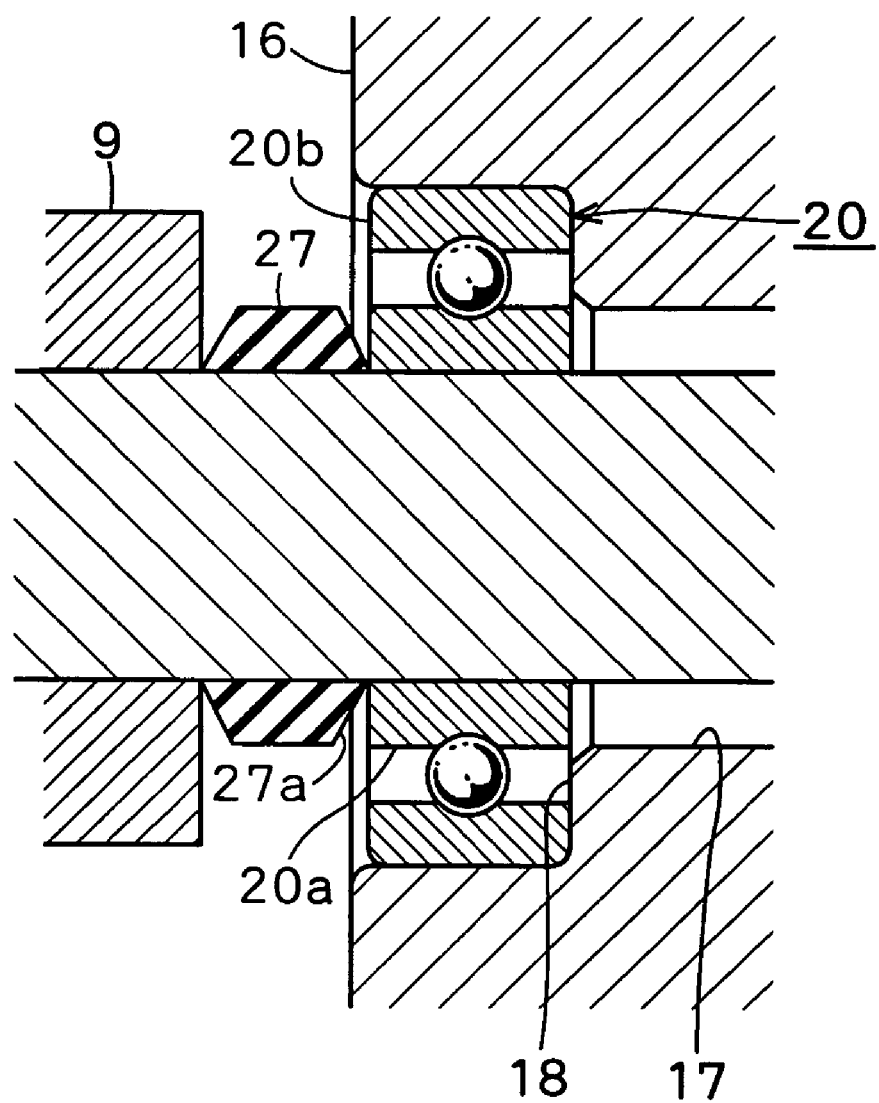
FIG. 5 is an enlarged sectional view showing a collar on a motor shaft.

As shown in FIG. 5, the collar 27 comprises an elastic rubber ring having a cross-section of trapezoid gradually wider towards the axis of the motor shaft 8, and the end face 27a pressingly contacts the inner race 20a of the first ball bearing 20 to apply axial pressure onto the inner race 20a outwards of the gear casing 16.

During rotation of the motor shaft 8, the collar 27 prevents the inner race 20a from moving axially towards the motor casing 3 with respect to the outer race 20b of the ball bearing 20 by a reaction force of the engagement of the worm 8c with the worm wheel 15. Thus, vibration or noise of the inner race 20a is prevented and lubricating oil applied to the motor shaft 8 and the ball bearing 20 is prevented from leaking.

The collar 27 comprises an elastic rubber ring having a trapezoidal section which becomes wider towards the axis of the motor shaft 8, thereby absorbing unevenness in accuracy of components in axial length of the commutator 9 pressingly fitted in the motor shaft 8 and in depth of the motor casing 2 to reduce the costs.

The foregoing merely relates to an embodiment of the present invention. Various changes and modifications may be made by a person skilled in the art without departing from the scope of claims wherein:

What is claimed is:

1. An electric actuator comprising:
   a motor casing;
   a gear casing detachably connected to the motor casing;
   a motor shaft extending in an axial hole along an axis in the motor casing and the gear casing and the motor shaft having a worm in the gear casing;
   a rotor fixed to the motor shaft to rotate therewith;
   a stator fixed on an inner circumferential surface in the motor casing;
   a ball bearing in an enlarged axial hole partially formed of the axial hole to support the motor shaft rotatably, said ball bearing having an inner race and an outer race; and
   a collar made of an elastic rubber ring pressingly fitted on the motor shaft to apply pressure onto the inner race of the ball bearing axially, and the collar having a trapezoidal transverse cross-section such that the collar gradually increases in width as the collar extends toward an axis of the motor shaft.

2. An electric actuator comprising:
   a motor casing;
   a gear casing detachably connected to the motor casing;
   a motor shaft extending in an axial hole along an axis in the motor casing and the gear casing and the motor shaft having a worm in the gear casing;
   a rotor fixed to the motor shaft to rotate therewith;
   a stator fixed on an inner circumferential surface of the motor casing, and said motor shaft being supported only by both ends of the worm in the gear casing; and
   a collar made of an elastic rubber ring being pressingly fitted on the motor shaft for applying axial pressure onto an inner race of a first bearing located adjacent one end of the gear casing. and the collar having a trapezoidal transverse cross-section such that the collar gradually increases in width as the collar extends toward an axis of the motor shaft.

3. The electric actuator as claimed in claim 2, further comprising:
   the first bearing supporting the motor shaft in a first enlarged axial hole partially formed of the axial hole at an intermediate location along the motor shaft; and
   a second bearing supporting the motor shaft in a second enlarged axial hole at an end of the gear casing opposite to the motor casing.

4. The electric actuator as claimed in claim 3 wherein the first bearing comprises a first ball bearing having first outer and inner races, the second bearing comprising a second ball bearing having second inner and outer races, the motor shaft being pressingly fitted in the first and second inner races, an end of the motor shaft in the second inner race being fixed by a nut, and the second outer race of the second ball bearing at an end of the gear casing being engaged and fixed by a cap.

* * * * *